Nov. 12, 1963   W. C. HOUSE   3,110,153
GAS GENERATOR TURBOJET MOTOR
Filed Sept. 5, 1950   4 Sheets-Sheet 1
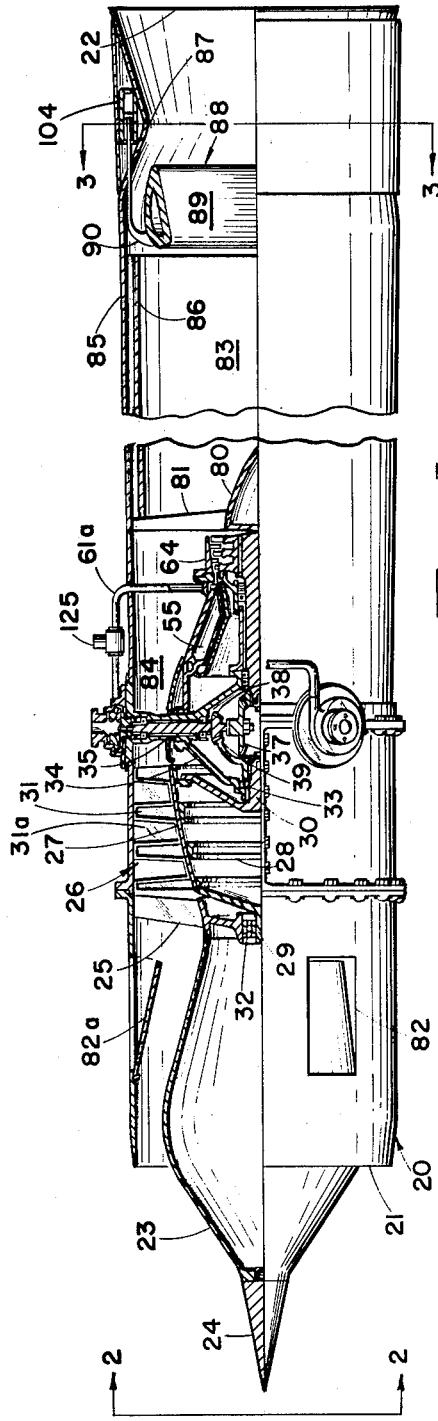
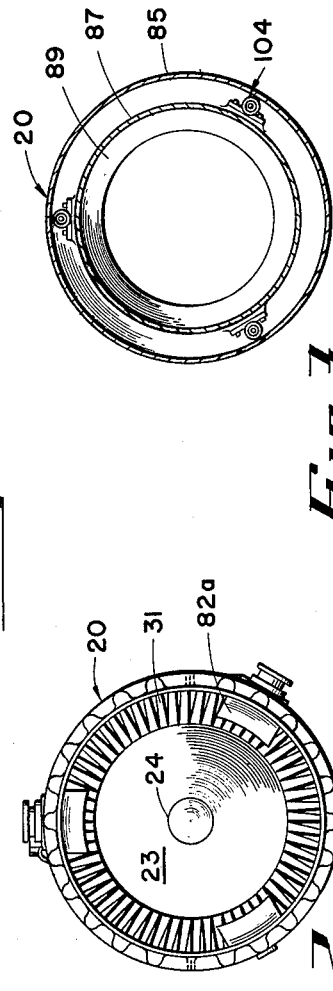
INVENTOR.
WILLIAM C. HOUSE
BY
D. Gordon Angus
ATTORNEY Nov. 12, 1963 W. C. HOUSE 3,110,153
GAS GENERATOR TURBOJET MOTOR
Filed Sept. 5, 1950 4 Sheets-Sheet 2

INVENTOR.
WILLIAM C. HOUSE
BY
D. Gordon Angus
ATTORNEY

Nov. 12, 1963 W. C. HOUSE 3,110,153
GAS GENERATOR TURBOJET MOTOR
Filed Sept. 5, 1950 4 Sheets-Sheet 3

INVENTOR.
WILLIAM C. HOUSE
BY
D. Gordon Angus
ATTORNEY

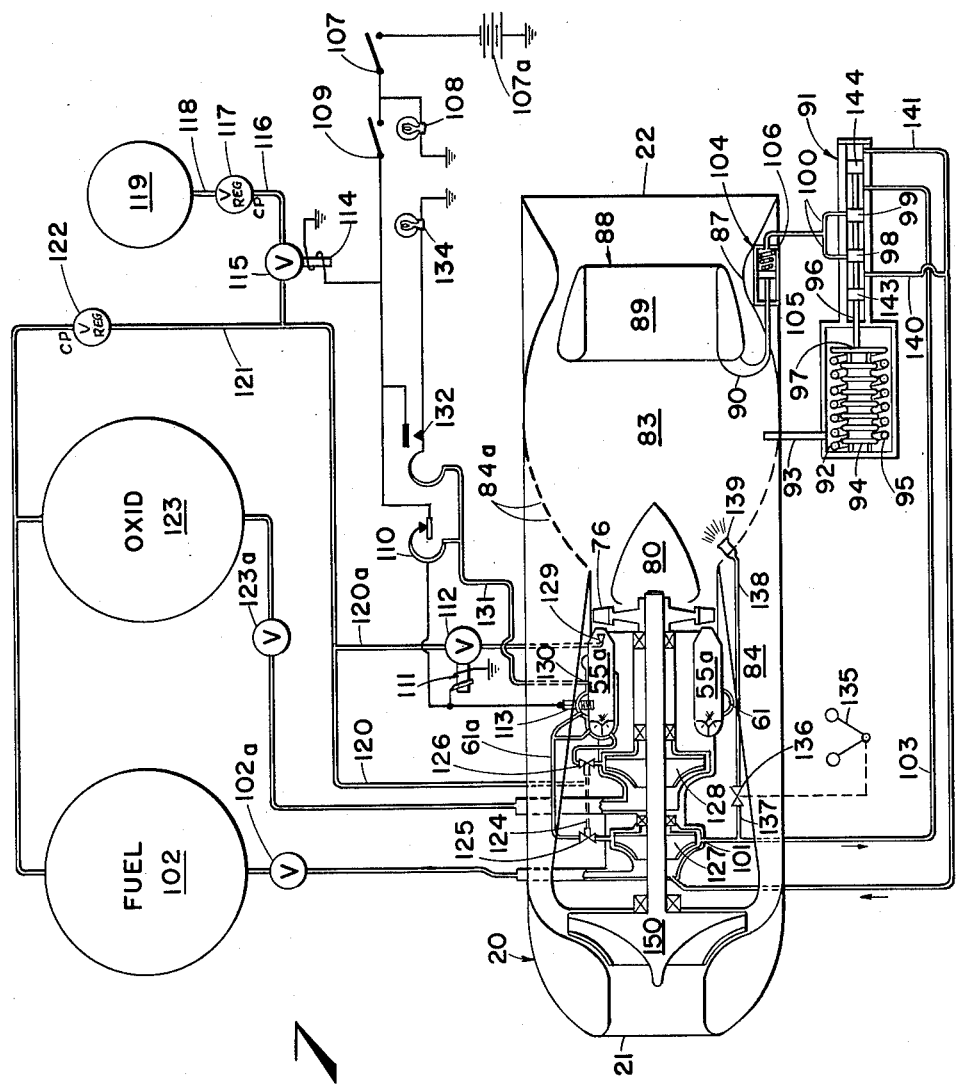

United States Patent Office 3,110,153
Patented Nov. 12, 1963

3,110,153
GAS GENERATOR TURBOJET MOTOR
William C. House, Pasadena, Calif., assignor, by mesne assignments, to Aerojet-General Corporation, Cincinnati, Ohio, a corporation of Ohio
Filed Sept. 5, 1950, Ser. No. 183,111
23 Claims. (Cl. 60—35.3)

This invention relates to jet propulsion and has for an object to produce an efficient, compact, jet propulsion system capable of operation both in the higher and lower atmospheres.

Heretofore, rocket engines have been used in both the upper and lower atmospheres, and for take-off of aircraft. Since they carry the fuel and also all the oxidizer required for combustion of the fuel to produce the jet, without using atmospheric oxygen for combustion, they operate even better in the upper atmospheres than in the lower atmospheres because of the reduced frictional air resistance in the upper atmospheres. They do, however, have the inherent limitation of having to carry all the oxidizer as well as all the fuel.

There have also been used turbojets comprising a turbine-driven air compressor which compresses the air from the atmosphere for use in combusting the fuel for driving the turbine and for producing the jet. Such turbojets have the advantage of not having to carry any oxidizer, and while they operate well in the lower or medium atmospheres, their efficiency becomes relatively poor in the upper atmospheres because of the rarity of the air needed for oxygen. Furthermore, their effectiveness at take-off is not especially good.

For the purpose of securing the advantage of the rocket motor at take-off and in the upper atmospheres, and also the advantage of the turbojet in the lower atmospheres, systems have been proposed which comprise both a rocket motor and a turbojet. An example of such a system is that shown in Zucrow application Serial No. 566,334, filed December 2, 1944, now Patent No. 2,531,761, and assigned to the same assignee as the present application. This comprises an air compressor driven by a turbine which operates to pump fuel and oxidizer to a rocket motor; and according to one variation, the fuel and oxidizer may be pumped to a combustion chamber for driving a turbine which operates the pumps. While such a system is effective at all altitudes, it involves rather cumbersome equipment.

In accordance with my present invention, I provide a unit which is very effective at all altitudes and yet is relatively compact. In fact, the unit can be made in the form of a compact duct. My novel arrangement comprises an air compressor driven by a turbine operated from a rocket chamber arrangement which has pumped into it, fuel and oxidizer carried by the unit. The exhaust from the turbine is carried into an afterburning chamber located downstream from the turbine and into which the compressed air is sent. Fuel can be sent into this afterburning chamber, and the exhaust from it provides the thrust.

In accordance with a preferred feature, the fuel-oxidizer mixture sent into the rocket chamber for operating the turbine, is made richer than necessary for driving the turbine. In consequence, some unburned fuel will pass through the turbine, and this will burn in the afterburning chamber upon mixing with the air sent into the afterburning chamber. Gases from this combustion in the afterburning chamber produce thrust when exhausted through the exhaust opening.

In accordance with another feature, fuel may be delivered or pumped directly into the afterburning chamber without passing through the turbine. Such fuel may be supplied either in addition to or instead of the over-rich fuel mixture which passes through the turbine.

The resulting products of combustion of both the rocket motor chamber and the afterburning chamber and heated air are exhausted through the exhaust nozzle located at the rear of the duct, thereby generating thrust.

In accordance with another feature, some of the air is by-passed around the afterburning chamber to provide cooling for the chamber walls.

A further optional feature resides in the provision of an automatic control for the exhaust nozzle orifice, this being capable of varying the area of the exhaust nozzle with variation of the pressure in the afterburning chamber.

An advantage of my novel arrangement is that it may be made in a simple unit in the form of a duct. By reason of the fact that part of the energy is supplied by the rocket motor arrangement, the duct may be made with a smaller frontal cross-section area and volume than is required in the usual turbojet engine, for the same amount of thrust.

Another feature of my invention is that the efficiency improves as the altitude and airplane speed increases which distinguishes it from the ordinary turbojet engine which actually decreases in efficiency as the altitude and/or airplane speed increase.

The compressor discharge temperature is determined by the inlet temperature of the air and the compressor pressure ratio. Since the inlet temperature will rise as the airplane speed increases, due to the ram pressure recovery, the compressor discharge temperature will likewise increase. In a conventional turbojet engine the gas temperature leaving the turbine nozzle cannot exceed the maximum allowable temperature that the turbine blades can withstand. Therefore, it becomes apparent as the speed of the airplane increases less and less fuel can be burned in the heated air without exceeding the maximum allowable nozzle discharge temperature. As a result increasing the speed of the airplane will decrease the efficiency of a conventional turbojet engine for any given altitude.

The afterburning process used in my device is free from the temperature limitation imposed by the turbine blades in the conventional turbojet engine. Furthermore, the operation can be conducted at more effective pressures than are obtainable by afterburning in a conventional turbojet tailstock.

Another feature of my invention is the provision of an automatically controlled exhaust nozzle orifice located at the rear of the duct that is capable of restricting the area of the exhaust nozzle as the afterburning chamber pressure decreases.

My invention will be better understood with reference to the following drawings and accompanying description in which:

FIG. 1 shows a longitudinal view of the device partly in cross section showing the position of the various elements;

FIG. 2 is a front plan view of the device shown in FIG. 1;

FIG. 3 is a cross section view of the device taken on the line 3—3 of FIG. 1;

FIG. 7 is a schematic view showing the relationship of the fuel and oxidizer supply tanks and accompanying controls to the high pressure gas generator turborocket.

Figure 4:
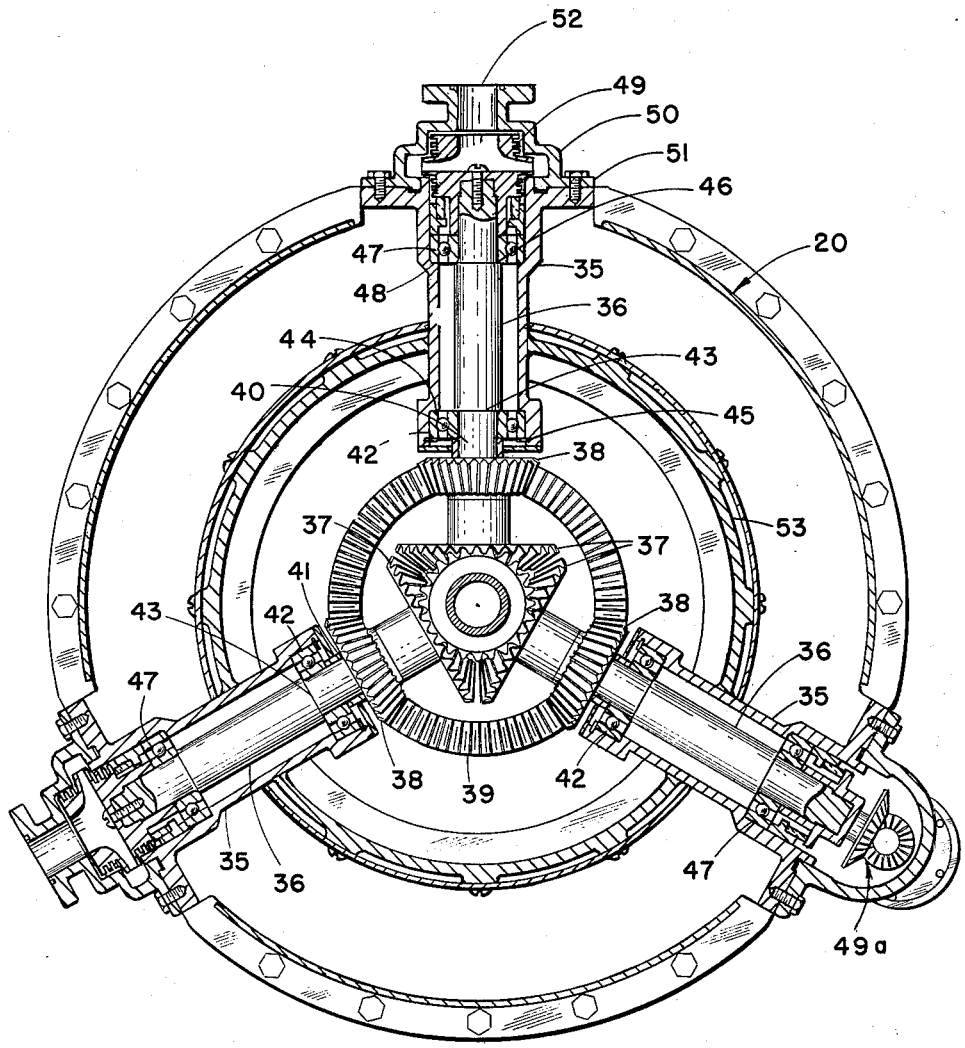
FIG. 4 is a cross section view showing the manner in which the pumping unit and compressor shafts may be coupled to the turbine shaft, and showing a power take-off shaft for driving engine accessories.

The device shown in FIG. 1 comprises an outer duct 20, preferably cylindrical in outline, provided with an entry opening 21 and an exhaust opening 22. Within the entry opening 21 there may be located a nose member 23 which is preferably streamlined to minimize turbulence and provide ram pressure recovery. The forward end 24 of nose member 23 is preferably shaped to present minimum resistance to the incoming air stream. The nose member 23 is supported by a plurality of braces 25, which are attached to the inner side of the duct 20.

Downstream from the nose member 23 there is provided an air compressor fan 26 which may be either a single stage or multiple stage unit, as required. Compressor 26 comprises a revolving drum-like member 27 provided with a plurality of circumferential ribs 28 for reinforcement. Drum-like member 27 is also provided with a forward shaft 29 and a rearward shaft 30 located at either end of the drum-like structure and lying substantially on its longitudinal axis. Shaft 29 rotates in bearing 32, which is also supported by the braces 25, and the shaft 30 rotates in a bearing 33 which is held in place by a plurality of brackets 34, which in turn are supported by a plurality of shaft housings 35. On the outside of drum-like member 27 there are secured a plurality of blades 31. These blades travel between corresponding fixed blades 31a as shown in FIG. 2. The fixed blades are attached to the inner surface of duct 20 at the proper positions. The axial flow compressor such as shown in FIGS. 1 and 2 may be replaced by a centrifugal type compressor such as is shown schematically in FIG. 7.

Duct 20 may be provided with a plurality of hinged panels 82a covering openings 82, preferably positioned ahead of the bracket 25, which will swing inward when the external pressure exceeds the internal pressure, thus permitting the entry of more air into the compressor 26, if required at low airplane speeds. These panels will automatically close at higher airplane speeds, when the ram pressure recovery causes the internal pressure to exceed the external pressure.

A plurality of shaft retainer housings 35 are positioned downstream from drum-like member 27 and are secured at one end to the sides of the duct 20 by bolting, welding, or other suitable means. The shaft housings are positioned so that their longitudinal axes pass through the same circumferential plane. This portion of the device is better illustrated by FIGS. 4 and 5.

Figure 5:
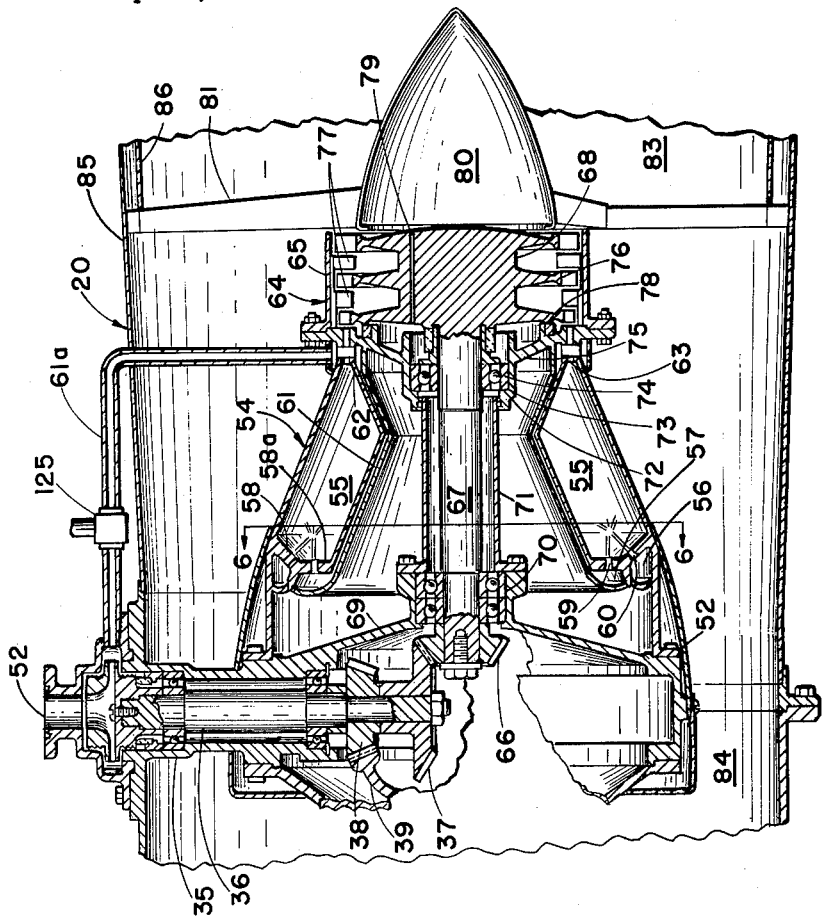
FIG. 5 is a cross sectional view showing the rocket motor and gas turbine mounted in the duct as well as one of the pumping units.

The embodiment illustrated by FIGS. 1, 4 and 5 employs three separate shafts, however, a greater or lesser number of shafts may be used as desired. When three shafts are used, as shown in FIG. 4, two of them are employed to drive the pumps while the third one merely serves as a utility shaft which may be employed for any purpose.

Within each shaft housing 35 there is a shaft 36. The shaft assembly in the housing 35 is as follows: The end of the shaft that is nearest to the center of the duct is made smaller in diameter than the rest of the shaft and a bevel gear 37 is keyed, or otherwise secured to this portion of the shaft. A second bevel gear 38 is also positioned on the same end of the shaft above gear 37. The two gears are preferably integral and resemble a cluster gear.

Gear 38 meshes with a bevel gear 39 secured to the end of a shaft 30.

Immediately adjoining gear 38, portion 40 of shaft 36 increases in diameter forming a shoulder 41 which prevents the cluster gear from sliding up on the shaft. A bearing 42 such as a roller or ball bearing is seated on portion 40 of the shaft. Immediately above the bearing 42 the shaft again increases in diameter forming a shoulder 43 against which the bearing 42 rests. The other end of bearing 42 is held in place on shaft 36 by means of a snap ring 45.

Bearing 42 and shaft 36 are held in place within shaft housing 35 by means of a bearing retainer 44 formed by decreasing the inner diameter of the shaft housing 35.

Above shoulder 43 shaft 36 continues at even diameter until a point near the upper end of the shaft is reached where the diameter of shaft 36 decreases forming a shoulder 46. A second roller or ball bearing 47 is seated on the shaft 36 against shoulder 46. Bearing 47 and shaft 36 are supported in shaft housing 35 by a second bearing retainer 48 formed by again enlarging the inner diameter of the shaft retainer 35. Above the bearing 47 there is secured to the end of shaft 36, in case the shaft is used to drive a pump, a pump impeller 49 which operates in a casing 50. Casing 50 has a flange 51 and an inlet through which fluid enters the pump. Otherwise the end of the shaft will have some coupling means 49a to permit the shaft to be used as a source of power.

Figure 6:
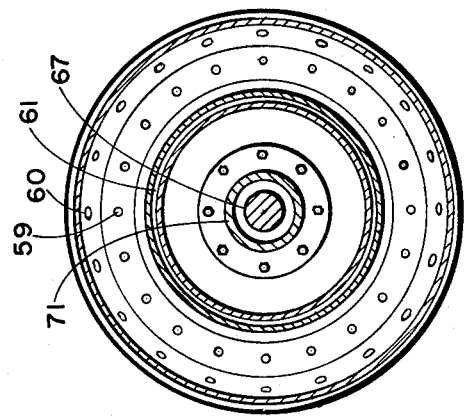
FIG. 6 is a view partly in cross section taken on the line 6—6 of FIG. 5.

Secured to shaft housings 35 there are a plurality of brackets 53 which support a high pressure gas generator assembly 54 as shown in FIG. 5 which is in effect a rocket motor. The rocket motor assembly 54, shown in FIG. 5, comprises, for example, a frusto conical firing chamber 55 which is preferably annular in cross section. The forward end of firing chamber 55 is provided with an annular passage 56 through which one of the propellant components is introduced and a second adjoining annular chamber 57 through which the second propellant component is introduced. Both of these annular chambers 56 and 57 are separated from the firing chamber 55 by partitions 58 and 58a respectively. Separating partitions 58 and 58a are provided with a plurality of suitable orifices 59 and 60 through which the liquids or fluids in each of the annular passages 56 and 57 flow into the combustion chamber 55. This portion of the reaction chamber is shown in greater detail in the cross section view FIG. 6. Partitions 58 and 58a are at an angle to each other to permit the fluids to impinge as shown in FIG. 5.

That portion of the annular chamber 55 facing the inner portion of the annulus is provided with a cooling jacket 61, supplied by conduit 61a which connects to a control valve 125 through which one of the propellant components is pumped. The rearward end 62 of the combustion chamber 55 is provided with a plurality of orifices 63, through which the gases generated by the combustion escape and impinge against blades 76 of the gas turbine 64. The rear end of combustion chamber 55 is secured to a turbine housing 65. This single, high pressure gas generator may be replaced by a plurality of smaller chambers 55a as shown in the schematic view of FIG. 7.

Gear 37 at the end of shaft 36 meshes with a bevel gear 66 connected to a drive shaft 67 that supports gas turbine rotor 68.

Shaft housings 35 are provided on their rearward side with a brace or braces 69. The central portion of the brace 69 serves as a bearing retainer for a bearing 70 on which shaft 67 rotates. A housing 71 surrounds shaft 67 and is attached to brace 69 at one end and to a second bearing support housing 72 at the other end in which there is a bearing retainer seat 73. Bearing 74 is seated in seat 73. Bearing support 73 and shaft housing 71 are held in place by a plurality of brackets 75 which are secured to the rearward end 62 of the high pressure gas generator assembly 54.

Shaft 67 is secured to a rotor 68 of a gas turbine 64. In the drawing the shaft is made an integral part of the drum for convenience, however, any other suitable construction may be used.

Gas turbine 64 comprises a plurality of movable blades 76. The number of groups of blades depends upon the number of stages which it is desired to employ in the turbine. A plurality of fixed blades 77 are secured to the side housing 65 which surrounds the movable blades 76 of the turbine. A sealing member 78 makes annular contact with the face of the gas turbine rotor and prevents the heat and gases that strike the blades from coming in contact with the bearing 74. A vent hole 79 equalizes the pressure between the discharge side of the turbine and the inlet side.

Downstream from the movable portion of the gas turbine 64 there is provided a streamlined tail member 80 to avoid turbulence. The streamlined tail member 80 is supported by a plurality of braces 81 which are attached to the inner side of the housing 20. In some instances tail member 80 may serve as a bearing support in case the rearward end of the gas turbine is to be supported.

Downstream from the streamlined tail member 80 there is provided an afterburning chamber 83 in which all excess fuel not reacted by the oxidizer in the gas turbine is ultimately consumed in the presence of the compressed air delivered by the compressor fan through surrounding ducts 84.

In order to prevent the wall 85 of duct 20 immediately surrounding the afterburning combustion chamber 83 from burning there is provided a cylindrical insert 86 which is spaced sufficiently far away from the wall 85 to allow sufficient air to flow therethrough and cool the wall 85.

Immediately downstream from the afterburning combustion chamber 83 the inner diameter of the duct decreases in area forming a throat 87. From throat 87 the diameter of the duct gradually increases until it conforms with the diameter of the rearward end 22 of duct 20.

Ahead of throat 87 there is provided an automatically adjustable orifice closure member 88, which is constructed as follows:

An annular streamlined member 89 is supported by arms 90 which are linked hydraulically to a piston-type control 104. This type of control may be remotely operated, or can be made to operate automatically by varying chamber pressures present in the afterburning combustion chamber 83. Member 89 is so constructed it can slide in and out of the throat 87 thereby providing a variety of exhaust openings from the afterburning combustion chamber 83.

FIG. 7 shows schematically the nozzle closure device of the type automatically operated by pressure in the afterburning chamber 83. In this schematic view the turbine and the alternate type of compressor 150, which is of the centrifugal type instead of the axial flow type shown in FIG. 1, as well as the fuel and oxidizer pumps, are shown coupled to a solid shaft for convenience only, instead of being driven through the complicated linkage shown in FIGS. 1, 4 and 5.

A hydraulic control 91 is connected to piston type control 104 and comprises a pressure tap 93 which opens into the afterburning combustion chamber 83 and conducts the chamber pressure into a bellows chamber 92 surrounding bellows 94. Bellows 94 has a constant volume of gas in it and is counterbalanced by a spring 95. As the pressure increases in the combustion chamber the pressure in chamber 92 likewise increases and the bellows 94 are compressed since the pressure on the external face 97 of the bellows is greater than the pressure acting on the interior portion of the bellows. Compressing the bellows 94 causes the shaft 96 to move and pull valves 98 and 99 with it leaving the passageways into line 100 open. Line 100 opens into a cylinder 104a of pressure control 104 which then will be subjected to whatever line pressure is present in conduit 100. When the valves 98 and 99 leave the entry ports to conduit 100 open the entire system will be substantially subjected to the hydraulic pressure that is present at the discharge outlet 101 of pump 127. The hydraulic fluid is supplied to the control 91 by a connecting conduit 103. The fluid flowing through the lines 103 and 100 is conducted to the rearward end of hydraulic control 104 and operates against a piston 105 causing the closure assembly 88 to move forwardly in the duct thereby increasing the area of the throat 87. When the pressure decreases in the afterburning chamber 83 the closure member 89 will move downstream towards the throat 87 thereby tending to decrease the area of the exhaust nozzle.

Cylinder 104 is provided with a counterbalancing spring 106 which helps to overcome the force exerted against the closure member 89 by the high velocity stream of air and combustion gases which push against the forward end of closure member 89.

Lines 140 and 141 are connected to the intake end of pump 127 and serve as vent lines to return any hydraulic fluid which may leak past the control valves 98 and 99 and also past the check valves 143 and 144.

The operation of the entire unit may be followed with reference to the schematic drawing FIG. 7, and for purposes of convenience the various steps in the operation of the device will be considered in the order in which they occur.

Switch 107 is first closed completing a circuit from a battery or other source of electrical energy 107a. The closing of the circuit is indicated by the illumination of an indicator light 108. Switch 109 is subsequently closed thereby completing the circuit through the contact points of pressure operable switch 110 which are normally closed. This energizes the solenoid 111 which operates the compressed gas shutoff valve 112 and at the same time energizes glow plug 113 causing it to heat up. A second solenoid valve 114 will also be energized simultaneously with solenoid 111 upon the closure of switch 109. Solenoid 114 is connected to a shutoff valve 115 located in conduit 116 which conducts gas from a pressure regulator valve 117. Regulator valve 117 is connected by a conduit 118 to a source of inert gas under pressure 119.

The opening of valves 115 and 112 by the solenoid causes gas to flow from pressure tank 119 through valve 115 into the branch conduit 120 and 121. The gas flowing through conduit 121 passes through a constant pressure valve 122 and from there into fuel tank 102 and oxidizer tank 123, subjecting the propellants to the required pressure. The gases flowing through conduit 120 into branch conduit 124 will act on a pair of pressure operable valves 125 and 126 which control the flow of fuel and oxidizer from tanks 102 and 123 respectively into the fuel pump 127 and the oxidizer pump 128. Flow from the propellant tanks to the pumps 127 and 128 is further controlled by valves 102a and 123a respectively. Gases flowing through line 120 will also pass into a branch conduit 120a and through the open valve 112.

The gas flowing through valve 112 will pass through the conduit into the nozzle 129 and escape from the nozzle impinging against the blades 76 of the gas turbine causing it to revolve and place the pumps 127 and 128 as well as the air compressor 26 in operation; this assists the unit to start. Since valves 125 and 126 have been opened by the gas pressure acting on line 120, fuel and oxidizer will flow into the annular manifolds 57 and 56 as soon as the pumps start running and will escape into the combustion chamber 55 through the orifices 60 and 59. The orifices 60 and 59 are directed to impinge against each other and since the glow plug 113 is already heated the mixture will start burning immediately generating high pressure gases in the combustion chambers 55a. The flow of fuel through valve 125 will also cause fuel to flow into cooling jacket 61 surrounding combustion chamber 55.

Fuels customarily used in the rocket combustion chamber are hydrocarbon fuels, and the oxidizer normally used therein is red fuming nitric acid. A typical hydrocarbon fuel, especially suitable for this purpose is an aromatic kerosene. Other fuels which may also be used are gasoline, kerosene, etc. In some instances, it may be desirable to use substances which will give a hypergolic reaction on mixing, such as, for example, aniline and red fuming nitric acid. In this case it is not necessary to energize the glow plug 113 since no ignition is necessary as the compounds become spontaneously ignited upon mixing. Other oxidizers, such as white fuming nitric acid, hydrogen peroxide, etc., may also be employed.

As stated above the fuel and oxidizer mixture is proportioned so that there will be an excess of fuel present in the mixture discharged into the combustion chamber 55. That portion of the fuel which will remain unburned as the gases escape from the turbine blades 76, cools the combustion gases and is discharged along with the combustion gases into afterburning chamber 83 where it mixes with the compressed air entering from the ducts 84 or through ducts 84 and perforations 84a if the construction used in the schematic device FIG. 7 is employed. All unburned fuel will burn in the afterburning combustion chamber 83 creating additional combustion gases and raising the temperature of the air and gases therein.

A pressure tap 130, opening into the combustion chamber 55a, will supply gases under pressure through conduit 131 to the normally closed pressure operable switch 110 and also to normally open pressure operable switch 132. As soon as the pressure in combustion chamber 55a and conduit 131 is sufficiently high the switch 132 will become closed and switch 110 will be opened, thereby interrupting the flow of electricity to the solenoid 111 and glow plug 113, and closing valve 112 thereby shutting off the flow of high pressure gas to the turbine and disconnecting glow plug 113. The circuit to solenoid 114 is still complete and inert gas under pressure will flow through conduits 120 and 121, to valves 125 and 126, and tanks 102 and 123 respectively. When an electrical circuit through pressure switch 132 is established, a second ready light 134 will become lighted and indicate that the system is operating normally.

From this point the operation of the device is that of a self-sustaining unit. The gases from the combustion chamber 55a will cause the turbine to rotate and the rotation of the turbine will cause the pumps 127 and 128, as well as the compressor 26 to rotate. These will deliver fuel, oxidizer, and air taken from the surrounding atmosphere, under pressure to the system. The fuel and oxidizer placed under pressure by the pumps 127 and 128 discharge into combustion chamber 55a against the chamber pressure. The combustion of the fuel and oxidizer in the combustion chamber 55a will generate heat and gases which will be added to the air in the afterburning combustion chamber and after they have passed through the gas turbine.

In case it is desired to increase the amount of combustion and heat energy developed in the afterburning combustion chamber 83 it is possible for the operator to increase the flow of unburned fuel into the afterburning combustion chamber. This is done by setting the throttle 135 to open flow control valve 136. Valve 136 is connected by branch conduit 137 to the line coming from the high pressure discharge 101 of pump 127 and when opened fuel will flow through conduit 138 through an injector 139 into the afterburning combustion chamber 83. Here the added fuel will mix with the compressed air coming from the compressor 26 and burn to generate large quantities of combustion gases under elevated pressure which will escape through the throat 87 and develop thrust.

The device according to my invention possesses the unique property that it is capable of operating efficiently under normally low atmospheric pressures, therefore, it will operate at practically any altitude at which there is oxygen. The entire energy necessary to drive the air compressor and pumping system is obtained from the high pressure gas generator 55 which in effect is a rocket motor. No energy is withdrawn from the afterburning combustion chamber, therefore, the amount of energy developed by my apparatus exceeds that of a conventional turbojet.

A particular advantage of my device is that it can operate efficiently over a wide range of speeds. The efficiency of an ordinary turbojet engine drops off as the speed of the airplane increases due to the fact that the faster the plane is traveling the hotter will be the temperature of the air reaching the compressor as a result of the ram pressure recovery. Since the temperature at which the air leaves the compressor is determined by the temperature of the air entering the compressor and the compressor pressure ratio, it is apparent that the greater the speed of the airplane the higher will be the temperature at which the air will leave the compressor. The maximum tolerable temperature within the turbojet system is fixed by the metallurgical characteristics of the turbine blades. It, therefore, follows that the amount of heat that can be added to the air discharged from the compressor, before the maximum tolerable temperature is reached by means of burning fuel therein, will be less at elevated velocities than at slower speeds. For this reason the efficiency of the turbojet at high speeds falls off appreciably.

In my apparatus the heat from the burning fuel does not augment the heat of the air discharged by the compressor before it passes through the turbine as is the case in a conventional turbojet engine, since fuel is burned in the afterburning combustion chamber, which is located considerably downstream from the turbine, and this heat never reaches the turbine. Furthermore, the temperature of the gases and fuel discharged from the rocket combustion chamber, which in my apparatus serves to drive the turbine, can be accurately controlled by correctly proportioning the amount of fuel and oxidizer introduced into the combustion chamber. As a result the turbine in my device operates at a substantially constant temperature regardless of the airplane speed.

Another advantage is that my apparatus can be operated at a more effective pressure within the afterburning combustion chamber. This pressure is considerably greater than the pressure obtainable by afterburning fuel in the tailstock section of a conventional turbojet engine.

Since the gases at high velocity from the rocket motor operate against the blades of the gas turbine which revolve at high speed more effective use is made of the exhaust gases than there would be if the gas generator were operating as a conventional rocket motor.

A further advantage of the device is that the frontal area of the compressor can be made smaller and the entire unit can be made much more compact for a given thrust than the conventional turbojet engine since the quantity of air required to operate the unit is considerably less than what would be required using the turbojet cycle.

An additional advantage of my device is that the closure member 88 compensates for any drop in atmospheric pressure as the unit operates at increasingly higher altitudes thereby maintaining the pressure within the afterburning combustion chamber substantially uniform over a wide range of elevations.

I claim:

1. A jet propulsion unit adapted to travel through air, said unit comprising a duct having an entry opening and an exhaust opening, said duct containing: an air compressor back of said entry opening, a gas generator comprising a combustion chamber having exhaust opening means, said chamber being airtight except for said exhaust opening means, whereby air is excluded from the chamber during operation, a first injector means for introducing fuel into said combustion chamber for combustion therein, a second injector means for introducing a liquid oxidizer into said combustion chamber, pumping means connected to pump said fuel and oxidizer from respective sources to the injector means, a gas turbine operable by the gas from said gas generator exhaust opening means, a second combustion chamber connected to receive the exhaust from said gas turbine, the outlet from said second chamber communicating with said exhaust opening, conduit means conveying the air from said air compressor into said second chamber, means for driving said pumping means from said turbine and means for driving said air compressor from said turbine, whereby the air and combustion products from said second combustion chamber are exhausted through said exhaust opening to produce thrust.

2. A jet propulsion unit according to claim 1 in which a streamlined nose member is positioned within said entry opening, upstream from said air compressor.

3. A jet propulsion unit according to claim 2 in which said duct is provided with a plurality of openings for introducing air into the duct downstream from said entry opening but ahead of said compressor.

4. A jet propulsion unit according to claim 3 in which said duct openings are provided with hinged covers which open inwardly.

5. A jet propulsion unit according to claim 1 in which the downstream portion of said second combustion chamber is provided with a constriction positioned upstream from said exhaust opening.

6. A jet propulsion unit according to claim 5 in which a variable construction means is provided in the area immediately preceding said constriction.

7. A jet propulsion unit according to claim 6 in which said variable constriction means is automatically operated by pressure sensitive means activated by pressure changes in said second combustion chamber.

8. A jet propulsion unit according to claim 1 in which the second combustion chamber is provided with an annular air duct surrounding said combustion chamber and lying within said main duct.

9. A jet propulsion unit according to claim 1 in which said gas generator is provided with a cooling jacket through which one of the propellant substances flows.

10. A jet propulsion unit for operation in an air medium comprising a duct having an entry opening and an exhaust opening, a turbine in the duct, an air compressor in the duct and driven by the turbine, and an after-burning chamber within the duct at the downstream side of the turbine, a gas generator having a combustion chamber and having exhaust nozzles from the last-mentioned chamber in driving relation with the turbine, said last-mentioned chamber being air-tight except for said exhaust nozzles, whereby air is excluded from the chamber during operation, pumping means driven from the turbine for pumping fuel and oxidizer from respective sources into the combustion chamber, means for carrying air from the air compressor to the afterburning chamber, means carrying the combustion products from the turbine to the afterburning chamber, and means for introducing fuel into the afterburning chamber for burning with the air therein, whereby the air and combustion products in the afterburning chamber are exhausted through the exhaust opening to produce thrust.

11. A method of generating thrust in a duct located in an air medium, said duct having an entry opening and an exhaust nozzle and containing a rocket motor having a gas generating combustion chamber and a gas turbine driven by gases from the combustion chamber, and an afterburning combustion chamber, which comprises: combusting a mixture of fuel and oxidizer in the absence of atmospheric air within said combustion chamber, and with an excess of fuel which is unburned in said chamber, driving said gas turbine by the combustion gases mixed with the unburned fuel exhausted from said combustion chamber, exhausting said combustion gases and excess fuel from the turbine into said afterburning chamber, introducing compressed air from the medium into said afterburning chamber and burning said excess fuel and compressed air in said afterburning chamber, and exhausting the gases from said afterburning chamber through said exhaust nozzle to generate thrust.

12. A method according to claim 11 which comprises introducing into said afterburning chamber a fuel in addition to said excess fuel from the turbine.

13. The method of jet propulsion through an air medium which comprises driving an air compressor from a turbine to compress air from the medium, blowing the compressed air into an afterburning chamber within the duct, driving the turbine by gases ejected from a combustion chamber wherein there are formed by combusting in the absence of atmospheric air, a fuel and oxidizer mixture which is over-rich in fuel so that some of the fuel is included with the combustion gases passing through the turbine, introducing said combustion gases and excess fuel into the afterburning chamber, burning said excess fuel with the air in the afterburning chamber and exhausting the air and combustion products from the afterburning chamber to create thrust.

14. The method of generating thrust in an apparatus comprising a duct having an entry opening and exhaust opening, a rocket motor located within said duct the exhaust from said rocket motor directed against the blades of the gas turbine, a compressor connected to said gas turbine lying within said duct, and a secondary combustion chamber downstream from said gas turbine, which comprises reacting an excess of fuel with a liquid oxidizer in said rocket motor, exhausting the gases from said rocket motor against the blades of the gas turbine thereby operating the compressor, combining the fuel rich exhaust gases from the rocket motor with the compressed air from said compressor, combusting said mixture in said secondary combustion chamber and exhausting the products of combustion from the secondary combustion chamber of the duct thereby generating thrust.

15. A jet propulsion unit adapted to travel through air, said unit comprising a duct having an entry opening and an exhaust opening, said duct containing: an air compressor back of said entry opening, a gas generator comprising a combustion chamber having exhaust opening means, said chamber being air-tight except for said exhaust opening means, whereby air is excluded from the chamber during operation, a first injector means for introducing fuel into said combustion chamber for combustion therein, a second injector means for introducing a liquid oxidizer into said combustion chamber, pumping means connected to pump said fuel and oxidizer from respective sources to the injector means, a gas turbine operable by the gas from said gas generator exhaust opening means, a second combustion chamber connected to receive the exhaust from said gas turbine, the outlet from said second chamber communicating with said exhaust opening, conduit means conveying the air from said air compressor into said second chamber, means for introducing fuel into said second combustion chamber for combustion with the air therein, means for driving said pumping means from said turbine and means for driving said air compressor from said turbine, whereby the air and combustion products from said second combustion chamber are exhausted through said exhaust opening to produce thrust.

16. A method of generating thrust in a duct located in an air medium, said duct having an entry opening and an exhaust nozzle and containing a rocket motor having a gas generating combustion chamber and a gas turbine driven by gases from the combustion chamber, and an afterburning combustion chamber, which comprises: combusting propellant material in the absence of atmospheric air within said combustion chamber, driving said gas turbine by the gases resulting from said combustion which are exhausted from said combustion chamber, exhausting said gases from the turbine into said afterburning chamber, introducing compressed air from the air medium into said afterburning chamber and burning any propellant material not completely combusted in the combustion chamber in said afterburning chamber, and exhausting the gases from said afterburning chamber through said exhaust nozzle to generate thrust.

17. A method of generating thrust in a duct located in an air medium, said duct having an entry opening and an exhaust nozzle and containing a rocket motor having a gas generating combustion chamber and a gas turbine driven by gases from the combustion chamber, and an afterburning combustion chamber, which comprises: combusting propellant material in the absence of atmospheric air within said combustion chamber so that the propellant materials are incompletely combusted in said combustion chamber, driving said gas turbine by the gases resulting from said incomplete combustion which are exhausted from said combustion chamber, exhausting said gases from the turbine into said afterburning chamber, introducing compressed air from the air medium into said afterburning chamber and burning said propellant material which was incompletely combusted in said combustion chamber in said afterburning chamber, and exhausting the gases from said afterburning chamber through said exhaust nozzle to generate thrust.

18. The method of jet propulsion through an air medium which comprises driving an air compressor from a turbine to compress air from the medium, blowing the compressed air into an afterburning chamber within a duct, driving the turbine by gases ejected from a combustion chamber wherein they are formed by the combustion of propellant material, introducing said combustion gases into the afterburning chamber, burning any propellant material not completely combusted in the combustion chamber in said afterburning chamber and exhausting the air and combustion products from the afterburning chamber to create thrust.

19. The method of jet propulsion through an air medium which comprises driving an air compressor from a turbine to compress air from the medium, blowing the compressed air into an afterburning chamber within a duct, driving the turbine by gases ejected from a combustion chamber wherein they are formed by the incomplete combustion of propellant material, introducing said combustion gases into the afterburning chamber, burning said propellant material which was incompletely combusted in said combustion chamber in said afterburning chamber and exhausting the air and combustion products from the afterburning chamber to create thrust.

20. A jet propulsion unit adapted to travel through air, said unit comprising a duct having an entry opening and an exhaust opening, said duct containing: an air compressor back of said entry opening, a gas generator comprising a combustion chamber having exhaust opening means, said chamber being air tight except for said exhaust opening means, whereby air is excluded from the chamber during operation, injector means for introducing propellant material into said combustion chamber for combustion therein, pumping means connected to pump said propellant material from a source to the injector means, a gas turbine operable by the gas from said gas generator exhaust opening means, a second combustion chamber connected to receive the exhaust from said gas turbine, the outlet from said second chamber communicating with said exhaust opening, conduit means conveying the air from said air compressor into said second chamber, means for driving said pumping means from said turbine and means for driving said air compressor from said turbine, whereby the air and combustion products from said second combustion chamber are exhausted through said exhaust opening to produce thrust.

21. A method of generating thrust in a duct located in an air medium, said duct having an entry opening and an exhaust nozzle and containing a combustible gas generating chamber and a gas turbine driven by gases formed in the gas generating chamber, and an afterburning combustion chamber, which comprises: forming combustible gases within said gas generating chamber in the absence of air, exhausting said combustible gases from said gas generating chamber to drive said gas turbine, exhausting said gases from said turbine into said afterburning chamber, introducing compressed air from the air medium into said afterburning chamber, burning said combustible gases and said air in said afterburning chamber, and exhausting the gases from said afterburning chamber through said exhaust nozzle to generate thrust.

22. A method of generating thrust in a duct located in an air medium, said duct having an entry opening and an exhaust nozzle and containing a gas generating chamber, a gas turbine driven by the gases from said gas generating chamber, and a compressor driven by said gas turbine, and an afterburning combustion chamber, which comprises: forming combustible gases within said gas generating chamber in the absence of atmospheric air, exhausting said combustible gases from said gas generating chamber, driving said gas turbine with the gases exhausted from the said generating chamber, compressing air entering said entry opening with said gas compressor driven from said gas turbine, exhausting both combustible gases from said turbine and the compressed air from said compressor into said afterburning chamber, burning said combustible gases and said compressed air in said afterburning chamber, and exhausting the gases from said afterburning chamber through said exhaust nozzle to generate thrust.

23. A jet propulsion unit adapted to travel through air, said unit comprising a duct having an entry opening and an exhaust opening, said duct containing: an air compressor in flow communication with the air entering said entry opening, means for generating a combustible gas, said means including an exhaust opening and being airtight except for said exhaust opening, whereby air is excluded from said means for generating combustible gases during its operation, a gas turbine adapted to be driven by the combustible gases exhausted from said exhaust opening, drive means connecting said gas turbine in driving engagement with said air compressor, a combustion chamber adapted to receive combustible gases exhausted from said gas turbine and the compressed air exhausted from said air compressor, whereby the compressed air and the combustible gases exhausted from said gas turbine are burned in said combustion chamber and exhausted through said exhaust opening in said duct to produce thrust.

References Cited in the file of this patent

UNITED STATES PATENTS

| | | |
|---|---|---|
| 2,419,866 | Wilson | Apr. 29, 1947 |
| 2,479,776 | Price | Aug. 23, 1949 |
| 2,482,505 | Pierce | Sept. 20, 1949 |
| 2,508,288 | Owner | May 16, 1950 |
| 2,527,732 | Imbert | Oct. 31, 1950 |
| 2,529,973 | Sedille | Nov. 14, 1950 |
| 2,531,761 | Zucrow | Nov. 28, 1950 |
| 2,542,628 | Christopher | Feb. 20, 1951 |
| 2,590,009 | Hannum | Mar. 18, 1952 |

FOREIGN PATENTS

| | | |
|---|---|---|
| 920,387 | France | Jan. 4, 1947 |
| 586,552 | Great Britain | Mar. 24, 1947 |
| 587,126 | Great Britain | Apr. 15, 1947 |